No. 828,011. PATENTED AUG. 7, 1906.
H. C. & E. C. AIKEN.
INCUBATOR.
APPLICATION FILED AUG. 21, 1905.
*Fig. 1.*
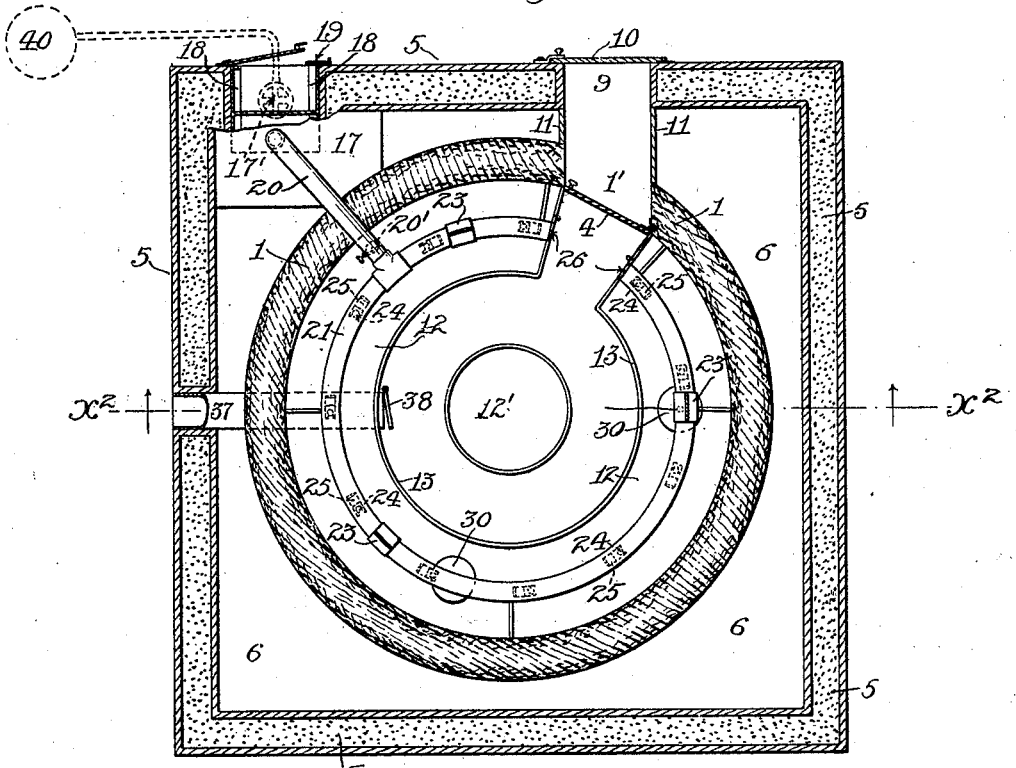
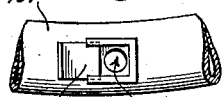
*Fig. 3.*
*Fig. 2.*
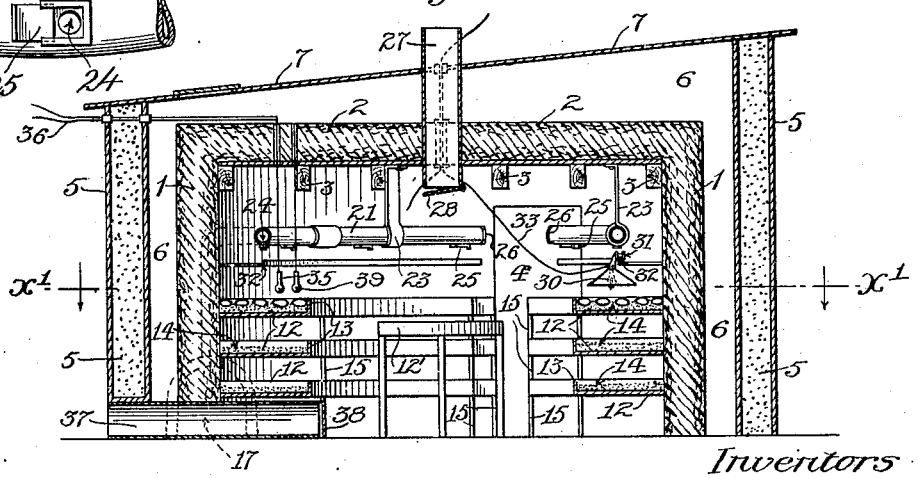
Witnesses:-
Frank L. Abraham
Verna A. Talbert
Inventors
Harry C. Aiken,
Elizabeth C. Aiken.
By Townsend, Lyon, Hackley & Knight
Attorneys

UNITED STATES PATENT OFFICE.

HARRY C. AIKEN AND ELIZABETH C. AIKEN, OF GLENDALE, CALIFORNIA; SAID HARRY C. AIKEN ASSIGNOR TO EDMUND S. SHANK, OF LOS ANGELES, CALIFORNIA.

INCUBATOR.

No. 828,011.      Specification of Letters Patent.      Patented Aug. 7, 1906.

Application filed August 21, 1905. Serial No. 275,010.

*To all whom it may concern:*

Be it known that we, HARRY C. AIKEN and ELIZABETH C. AIKEN, citizens of the United States, residing at Glendale, in the county of Los Angeles and State of California, have invented new and useful Improvements in Incubators, of which the following is a specification.

The main object of this invention is to provide an incubator which will retain the requisite even temperature without the necessity of constant and delicate regulation of the heat-supply.

The object is attained by inclosing the eggs within walls formed of earth, masonry, or other heat retaining and insulating material of sufficient thickness to absorb or give out the heat during intervals of fluctuations. When the heating apparatus has been adjusted to supply the amount of heat required on the average to raise the incubator to the proper temperature, the minor fluctuations of temperature will be compensated or neutralized by this heat retainer and insulator.

A further object of the invention is to provide an incubator wherein the attendant can enter the inclosure wherein the eggs are placed, so as to enable most convenient manipulation and inspection of the eggs and to enable such manipulation and inspection while the inclosure is closed against communication with the outer air.

The accompanying drawings illustrate the invention.

Figure 1 is a horizontal section on the line $x'\ x'$ in Fig. 2. Fig. 2 is a vertical section on the line $x^2\ x^2$ in Fig. 1. Fig. 3 is a detail inverted plan of one of the regulating-valves in the air-supply conduit.

1 designates the inclosure or wall of the incubator, formed of adobe, earth, clay, masonry, or other material of sufficient heat insulating, absorbing, and retaining quality and of sufficient thickness to maintain the temperature therein substantially constant notwithstanding the usual variations in external temperature. The roof 2 of this inclosure is formed of similar material, with supporting-beams 3.

Wall 1 has an opening 1' at one side closed by a door 4. An outer wall, housing, or inclosure 5 is also provided, surrounding the inclosure 4 and separated therefrom to form an air-chamber 6, that extends all around inclosure 4 and also over the top of same between said top and the roof 7 of said housing. The wall 5 is preferably of heat-insulating material—for example, board walls with a packing of sand. From the opening 1' in the inclosure-wall 4 a passage-way extends to a doorway 9 in the outer wall, provided with an outer door 10, said passage-way being formed by partitions or walls 11, connecting the walls 1 and 5.

Shelves 12, of which there may be any desired number, are arranged within the inclosure-wall 1 next to said wall, each of said shelves having a flange 13 at its outer edges and suitable material, such as sand, (indicated at 14,) on said shelves to form a bed on which the eggs are placed. Three of these shelves are shown, only the top one being used for eggs, the lower ones being used as nurseries. All of the shelves are cut away or omitted at the opening 1' to permit access to the space within the shelves. The inclosure-wall 1 is preferably circular, the shelving 12 being annular. The shelving may be attached to the wall 1 and may also have supporting-posts 15. A center shelf 12' may also be provided.

The means for heating the inclosure consists of a furnace 17, located, for example, within the outer housing 5 and provided with a burner 17' and with chamber 18 communicating with a valved inlet 19 and with a flue 20, having a valve 20', said flue leading to a conduit or pipe 21, said pipe 21 being preferably annular and extending within the inclosure-wall 1 above the shelves 12, but leaving a gap above the break in the shelving. Said pipe is carried by supports 23 and is provided with openings 24, controlled by slides or valves 25, and the end of the pipe is similarly closed by a valve or slide 26. Openings 24 are on the bottom of pipe 21, so as to direct the flow of warm air down onto the uppermost shelf 12. A ventilator shaft or flue 27 extends upwardly from the top of inclosure 1 to the outer air, this ventilator having a valve or slide 28 to regulate the ventilation, and an inlet-ventilator 37, with slide 38, is opened through walls 1 and 5 to admit cool fresh air.

The inclosure 1 is closed in such manner that no light enters from outside, and means are provided for artificial lighting, the light being applied only locally and for as short a time as possible. For this purpose two electric lamps 30 are provided, mounted on hangers or trolleys 31, running on rails 32, said lamps being supplied with flexible cords 33, extending from fixed connections on, for example, the ventilator 27, to which supply-wires 33 lead from a supply-circuit.

A thermometric or thermometer device 35 is provided within the inclosure 1 and indicates the temperature of said inclosure, being, for example, connected by wires 36 to a suitable receiver (not shown) which may be situated at a distance, as in a neighboring house. A hygrometer 39 is provided to indicate the humidity.

The operation is as follows: By regulation of the hot-air supply and the ventilators 27 37 the temperature of the inclosure-wall and of the air inclosed therein is brought to the proper degree for incubation. The eggs are placed on the top shelf and are there subjected to the full temperature of the incubator, the heat from the pipe being applied directly over them. To produce the uniform heating, the openings nearest the supply-pipe 20 are contracted by partially closing their valves 25, while the openings more remote from the supply are opened wider. Having once brought the plant to the incubating-temperature, it is only necessary to keep the furnace burning low and at a uniform rate, the loss of heat being small and there being no necessity of changing the amount of heat supplied at different hours of the day, as diurnal and other ordinary variations of temperature are neutralized by the heat storing and equalizing effect of the thick walls. In order that the furnace may deliver the constant amount of heat necessary to supply the average loss by radiation from the structure, it is desirable to use therein a hydrocarbon-burner, which can be regulated for constant output of hot air. When it is desired to inspect the eggs or to manipulate the eggs for turning the same or testing and removing infertile eggs, attendant can enter the inclosure, closing both the outer and inner doors, so that the space within the inclosure is maintained out of communication with the outer air. Then by turning on the electric lights and moving the lamps around to the desired part he can inspect and handle the eggs at any part of the shelves without throwing light on the other parts. The humidity of the air in the inclosure is observed by means of device 39 and is regulated by application of water, locally, if necessary, and also by spraying, if desired, the humidity being gradually increased as the incubation proceeds. The oil-supply 40 for the furnace is preferably located at a distance from the housing 5 for safety—say fifty feet.

With an incubator constructed as above described and of proper dimensions—say about twenty feet square outside and about fourteen feet diameter inside—several thousand eggs can be incubated simultaneously. Moreover, eggs of different kinds—such as chicken, duck, turkey, and ostrich eggs—can be incubated at once, and the different batches can be hatched out without regard to the time at which others are started. Some eggs, such as ducks', require somewhat lower temperature than others, and may therefore be placed on the center table 12' or on a part of table 12 that is kept cooler than the others, as by regulating the dampers.

What we claim is—

1. An incubator comprising an inclosure with a thick wall of heat absorbing, retaining and insulating material, shelving around the inside of said wall said wall and shelving having a passage formed to permit access to the space within the shelving—a door closing said passage, and means for applying heat to said inclosure.

2. An incubator comprising an inclosure with a thick wall of heat absorbing, retaining and insulating material, having an opening at one side a door for said opening, shelving extending within said wall having a passage extending from said opening to the space within the shelving, an air-supply pipe extending over said shelving and provided with valved downwardly-directed outlets, means for supplying heated air to said pipe, and valved ventilators at the top and bottom of said inclosure.

3. An incubator comprising an inclosure with a thick wall of heat absorbing, retaining and insulating material, having an opening at one side a door for said opening—shelving extending within said wall having a passage extending from said opening to the space within the shelving an air-supply pipe extending over said shelving and provided with valved downwardly-directed outlets, means for supplying heated air to said pipe, and a valved ventilator in the top and bottom of said inclosure, and a housing surrounding the aforesaid inclosure, with its wall and roof separated from the wall and roof of the inclosure, and with a door at one side, partitions connecting the walls of the inclosure and housing to form a passage-way between the doorways thereof and a door at the end of said passage.

4. An incubator comprising an inclosure, shelving in the inclosure for holding eggs, the wall of said inclosure and shelving being formed with a passage-way and a door for said passage-way.

In testimony whereof we have hereunto set our hands, at Los Angeles, California, this 11th day of August, 1905.

HARRY C. AIKEN.
ELIZABETH C. AIKEN.

In presence of—
ARTHUR P. KNIGHT,
VERNA A. TALBERT.